United States Patent
Meyer et al.

(10) Patent No.: US 10,745,307 B1
(45) Date of Patent: Aug. 18, 2020

(54) WASTEWATER TREATMENT PROCESSES

(71) Applicant: Molly Meyer, LLC, Chicago, IL (US)

(72) Inventors: Molly Meyer, Chicago, IL (US);
Michael Repkin, Chicago, IL (US)

(73) Assignee: Molly Meyer, LLC, Chicago, IL (US)

( * ) Notice: Subject to any disclaimer, the term of this patent is extended or adjusted under 35 U.S.C. 154(b) by 305 days.

(21) Appl. No.: 15/953,605

(22) Filed: Apr. 16, 2018

Related U.S. Application Data

(60) Provisional application No. 62/485,555, filed on Apr. 14, 2017.

(51) Int. Cl.
| | |
|---|---|
| *C02F 3/10* | (2006.01) |
| *C02F 3/34* | (2006.01) |
| *C05C 5/00* | (2006.01) |
| *C05B 17/00* | (2006.01) |
| *C02F 3/32* | (2006.01) |
| *C02F 101/16* | (2006.01) |
| *C02F 103/20* | (2006.01) |

(52) U.S. Cl.
CPC ............. *C02F 3/107* (2013.01); *C02F 3/104* (2013.01); *C02F 3/325* (2013.01); *C02F 3/341* (2013.01); *C05B 17/00* (2013.01); *C05C 5/00* (2013.01); *C02F 2101/16* (2013.01); *C02F 2103/20* (2013.01)

(58) Field of Classification Search
CPC .......... C02F 3/107; C02F 3/104; C02F 3/341; C02F 3/325; C02F 2103/20; C02F 2101/16; C05B 17/00; C05C 5/00
USPC ....... 210/602, 615, 616, 617, 620, 150, 151, 210/903
See application file for complete search history.

(56) References Cited

U.S. PATENT DOCUMENTS

| | | | |
|---|---|---|---|
| 5,071,462 A | 12/1991 | Kimura | |
| 5,087,353 A | 2/1992 | Todd et al. | |
| 5,462,666 A | 10/1995 | Kimmel | |
| 6,893,567 B1 | 5/2005 | Vanotti et al. | |
| 2004/0159607 A1* | 8/2004 | Kilian | C02F 3/085 210/616 |
| 2005/0000906 A1 | 1/2005 | Blais et al. | |
| 2005/0109697 A1 | 5/2005 | Olivier | |
| 2007/0029243 A1 | 2/2007 | Blais et al. | |

(Continued)

FOREIGN PATENT DOCUMENTS

| | | |
|---|---|---|
| DE | 10 2005 031 397 A1 | 1/2007 |
| WO | WO 2016/178580 A2 | 11/2016 |

OTHER PUBLICATIONS

Lazur, A. "Growout Pond and Water Quality Management," in JIFSAN Good Aquacultural Practices Program (University of Maryland, 2007).

(Continued)

*Primary Examiner* — Fred Prince
(74) *Attorney, Agent, or Firm* — Woodard, Emhardt, Henry Reeves & Wagner, LLP

(57) ABSTRACT

Geo-biological processes are designed to treat wastewater generated in animal feed lots when washing away feces, urine and other materials or in municipal wastewater systems. The present processes are focused on recovering a nutrient load in the wastewater for use as fertilizer and corresponding to separate mostly purified water for reuse. Alternate embodiments are algae and microbe based processes. The processes can be used individually or in various permutations.

19 Claims, 3 Drawing Sheets

(56) References Cited

U.S. PATENT DOCUMENTS

| | | |
|---|---|---|
| 2008/0314837 A1 | 12/2008 | Vanotti et al. |
| 2009/0282882 A1 | 11/2009 | Verhave et al. |
| 2012/0064622 A1 | 3/2012 | Fischer et al. |
| 2012/0085705 A1 | 4/2012 | Theodore et al. |
| 2015/0020239 A1 | 1/2015 | von Maltzahn et al. |
| 2016/0115091 A1 | 4/2016 | Bartek et al. |
| 2018/0065896 A1 | 3/2018 | Van Iersel et al. |

OTHER PUBLICATIONS

Soeder, C J Massive Cultivation of Microalgae: Results and Prospects; Hydrobiologia, vol. 72, No. 1/2, p. 197-209 (Jul. 1980) 2 Fig, 10 Tab, 72 Ref.

\* cited by examiner

WASTEWATER TREATMENT PROCESSES

FIELD OF THE DISCLOSURE

Embodiments of the present disclosure include processes and products for treating wastewater, for example with applicability to agricultural wastewater generated in animal feed lots and to municipal wastewater.

BACKGROUND

In animal feed lots it is typically desirable to clean or wash the areas where animals are housed and kept, for example to wash away feces, urine and other materials. When water is used to clean the areas, wastewater or waste liquid is generated. The waste liquid generated carries suspended solids, ammonia and nitrogen compounds and a nutrient load. Ideally the solids and nutrients can be separated from the water for use as fertilizer and ideally the water can be purified or clarified for reuse, for example in a future cleaning process. Commonly, the waste liquid from the feed lot is initially processed, for example in a settling tank, and a portion of the nutrient load may be recovered; however, a significant amount of the suspended solids and nutrient load remains in the waste liquid.

It is desirable to improve the removal of the suspended solids and nutrient load to increase the fertilizer yield and the purification/clarification of the remaining water. It is also desirable to improve the capture of ammonia and nitrogen compounds. Waste from municipalities is also typically carried via water as waste liquid, requiring treatment of municipal wastewater to remove pollutants from the water. It is desirable to improve the removal of suspended solids and clean the water for re-use or for re-entry into natural waterways.

SUMMARY

Certain embodiments of the present disclosure provide processes designed to treat wastewater generated either in animal feed lots when washing away feces, urine and other materials or in municipal wastewater systems. The waste liquid generated carries a nutrient load which ideally can be separated from the water for use as fertilizer and ideally the water can be purified for reuse. In existing processes, the waste liquid from the feed lot may be partially processed, for example in a settling tank, and a portion of the nutrient load is recovered. However, a significant portion of the nutrient load remains in the waste liquid.

The present processes are focused on recovering the nutrient load for use as fertilizer and corresponding to separate mostly purified water for reuse by the feedlot or for reentry into natural waterways, sometimes with accelerated processing times. In certain embodiments, processes also provide advantages of capturing ammonia and other nitrogen compounds, reducing hydrogen sulfide, reducing phosphorus compounds, and reducing other volatile organic compounds.

Several processes or subprocesses are geo-biological processes. Alternate embodiments are algae and microbe based processes or subprocesses. The processes can be used individually or in various permutations. In some embodiments or combinations, up to 99% of the original nutrient load can be recovered.

A representative method of treating wastewater includes cultivating an aerobic bacteria suitable for oxidizing ammonia into nitrite and nitrite into nitrate. The process involves dosing a geologic material with the aerobic bacteria to colonize particles of the geologic material. Then, the process includes mixing the combined aerobic bacteria and geologic material as loose particles into a wastewater liquid containing suspended solids, and holding the mixture in detention for a time period sufficient to allow the suspended solids to flocculate with the loose particles to float or precipitate. Thereafter the process includes separating the mixture to remove an output liquid from the flocculated particles.

One example of a geologic material is dolomite. In some embodiments, the dolomite particles are classified in size as fine. In certain embodiments, the aerobic bacteria is selected from *Nitrosomonas* spp., *Nitrobacter* spp. and *Nitrospira* spp.

Some embodiments include cultivating a microbial poly culture including or consisting of bacteria genera, and dosing the geologic material with the aerobic bacteria and the microbial poly culture to colonize particles of the geologic material prior to mixing the geologic material with the wastewater. In selected embodiment, the method includes dosing the geologic material with the aerobic bacteria, the microbial poly culture and a cellulosic biomass containing carbon to colonize particles of the geologic material prior to mixing the geologic material with the wastewater.

In certain embodiments, used separately or in combination with other embodiments, a method of treating wastewater includes cultivating a green algae mixture designed to promote mixatrophic algae growth and then dosing a wastewater liquid either initially or as the output liquid from prior processing with the green algae mixture. The process includes holding the mixture in detention for a time period sufficient to allow suspended solids in the liquid to flocculate with the green algae mixture to convert a portion of the suspended solids to biomass material. The process includes separating the mixture to remove the biomass material from the output liquid.

Additional objects and advantages of the described embodiments are apparent from the discussions and figures herein.

DESCRIPTION OF ILLUSTRATED EMBODIMENTS

Figure 1:
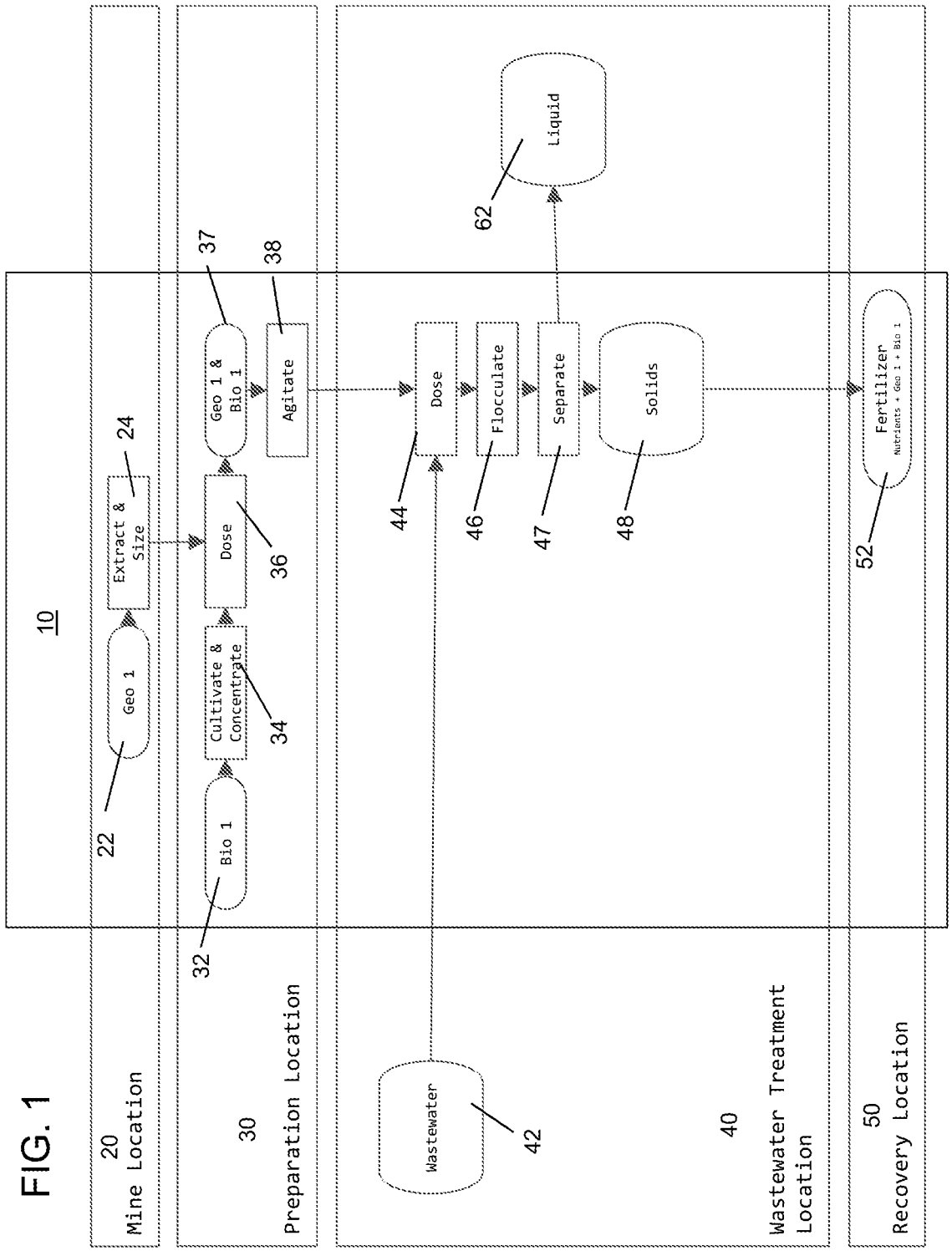
FIG. 1 illustrates one embodiment of a treatment process.
Figure 2:
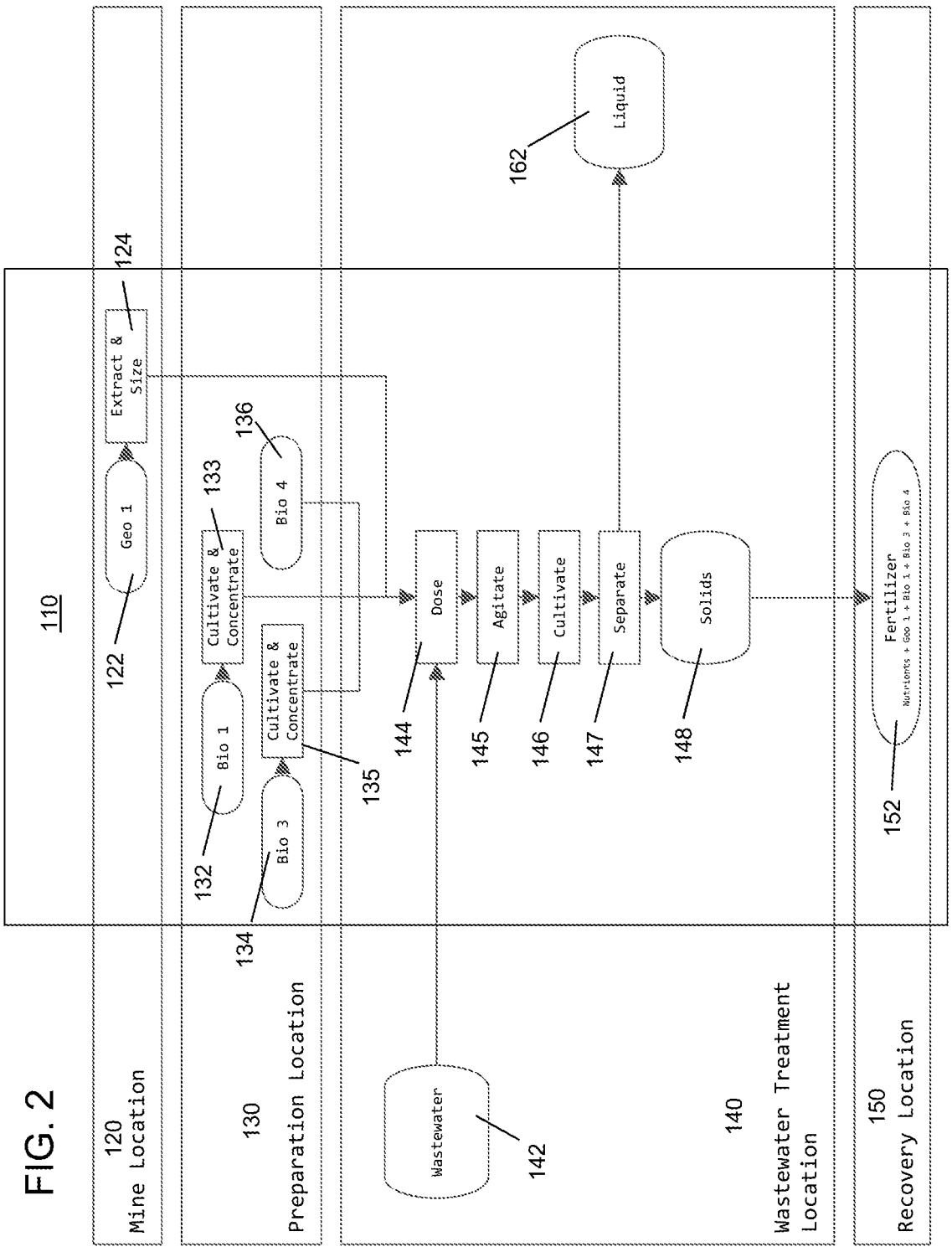
FIG. 2 illustrates an alternate embodiment of a treatment process.
Figure 3:
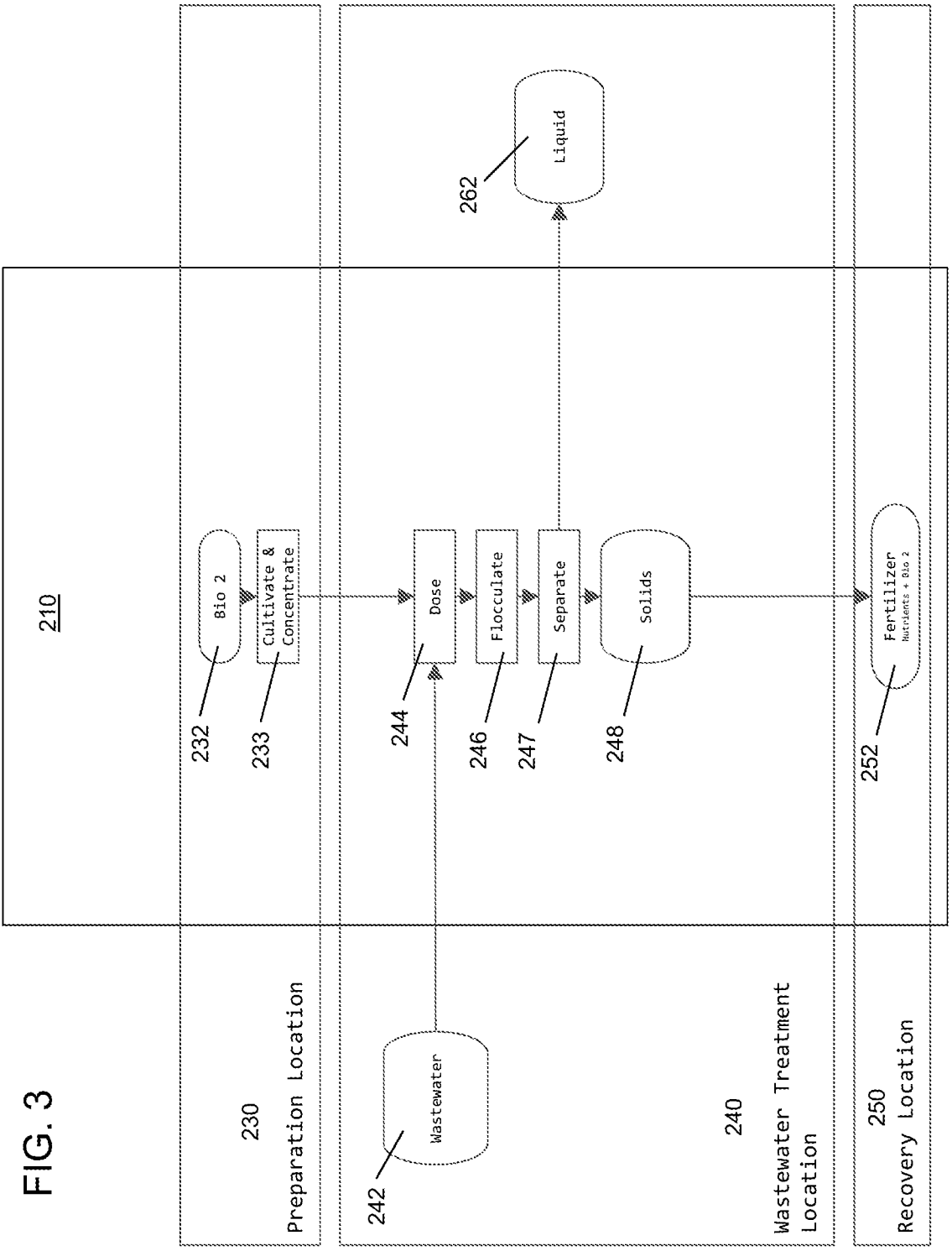
FIG. 3 illustrates a further embodiment of a treatment process.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates The processes herein can be designed to treat wastewater generated in animal feed lots when washing away feces, urine and other materials or to treat municipal wastewater. The waste liquid generated carries a nutrient load which ideally can be separated from the water for use as fertilizer and ideally the water can be purified for reuse or safe reentry into natural waterways. In existing processes, the waste liquid from the feed lot may be initially processed, for example in a settling tank, and a portion of the nutrient load is recovered. However, a significant portion of the nutrient load remains in the waste liquid.

The present processes are focused on recovering total suspended solids and the corresponding remaining nutrient load for use as fertilizer and corresponding to separate mostly purified water for reuse or reentry into natural waterways by the feedlot, sometimes with accelerated processing times. In certain embodiments, processes also provide advantages of capturing ammonia and other nitrogen compounds, reducing hydrogen sulfide, reducing phosphorus compounds, and reducing other volatile organic compounds. The processes can be used individually or in various permutations. In some embodiments or combinations, up to 99% of the original nutrient load and suspended solids can be recovered. In other embodiments, at least 70% or at least 80% of the nutrient load and suspended solids can be recovered.

In certain embodiments the process or sub-process is a geo-biological process. Process 10 illustrated in FIG. 1 uses particles of a geologic GEO1 material 22 for example obtained from a mine location 20. GEO1 materials may be calcium containing minerals such as dolomite, limestone, calcite, or crushed coral. In certain embodiments the particles are porous. The GEO1 materials may be insoluble basic salts such as calcium oxide, magnesium oxide, lime products or limestone products. The GEO1 material can also be selected to assist in phosphorus precipitation. Other delivery carriers can alternately be chosen in certain embodiments, such as porous pellets of various materials for example polymers. A specific example GEO1 material is dolomite which may, for example be a by-product of a limestone mining operation. Dolomite is primarily composed of calcium-magnesium carbonate ($CaMg(CO_3)_2$).

The GEO1 material is extracted and sized 24, preferably to a particle size classified as "fine". A "fine" particle size is commonly understood as a grain size where the diameter of the individual grains is about 125-250 μm (0.0049-0.010 in). The particle size may require that the GEO1 material is liquefied in water to be effectively moved to a preparation location 30. In an alternate embodiment (not illustrated), the GEO1 material 22 alone is mixed with the wastewater liquid 42. In this approach, the GEO1 material particles will flocculate with the nutrients in the liquid and a percentage of the nutrient load will be separated and recovered as fertilizer.

In the embodiment shown in FIG. 1, at the preparation location 30 BIO1 ingredients 32 are cultivated and concentrated 34 and then dosed 36 and mixed 37 to colonize particles of the GEO1 material 22. An example concentration is four liters per ton of geologic material when the culture meets or exceeds 1000 cells per milliliter. The BIO1 biologic ingredients are generally aerobic bacteria chosen for nitrification, to oxidize ammonia into nitrite and oxidize nitrite into nitrate. Examples of bacteria suitable as BIO1 ingredients include mixtures of *Nitrosomonas* spp., *Nitrobacter* spp. and *Nitrospira* spp. The GEO1 and BIO1 mixture can be agitated 38 to mix the components and enhance colonization. In certain embodiments, the preparation location 30 may be the same location as the wastewater treatment location 40. In alternate embodiments, the GEO1 and BIO1 mixture is packaged, for instance in a sealed container. The container can then be transported from the preparation location 30 to the wastewater treatment location 40. In some embodiments, the GEO1 and BIO1 mixture is sold as a prepared product.

Wastewater 42 is located/supplied at the treatment location 40. The wastewater 42 may have been previously processed, for example in a settling tank, and a portion of the total suspended solids (TSS) and corresponding nutrient load may have been previously removed. The combined GEO1 material and BIO1 ingredient mixture is dosed 44 and mixed as loose particles into the wastewater liquid 42. The BIO1 ingredients are applied in a defined dosage based on in-situ factors characteristic of each site's unique chemistry. Dosages may vary substantially from site to site but are generally less than 10% by volume BIO1 to the wastewater. In certain example embodiments of process 10, the BIO1 ingredients are dosed at a ratio of less than 5% by volume to the wastewater and the GEO1 material is dosed at a ratio of less than 10% by volume to the wastewater. The particular dosage for a volume of wastewater is dependent on the contaminant load in the wastewater and the microbiological activity within the wastewater. Lower levels generally are milligram to milligram ratios but in higher concentrations it may be necessary to utilize ratios in a range from about two to sixteen times the GEO1 reactant to remove contaminants. In some circumstances, specific dosage determinations will be made by the wastewater treatment plant operator based on tests of samples that are representative of the daily load at treatment location.

The mixture is held in detention, for example for at least 15 minutes and optionally for longer periods such as between 15 minutes and 1 day. In certain embodiments, a longer detention period may be used. The specific detention time is partly determined based on the separation methods used and the nutrient management recovery goals. With operations that are constrained to tight geographic footprints, it may be difficult to have longer settling times. In some circumstances, methodologies for solids recovery may be confined to separation technologies that will rapidly remove solids and will take up a minimum amount of space. Examples may include but are be limited to centrifugation and membrane solids separation.

This causes a portion of the TSS and nutrient load to clump or flocculate 46 and the flocculated portions may float or precipitate, allowing the flocculated portions to be separated 47 into solids 48 and output liquid 62. Example options for separating solids 48 from output liquid 62 include filtration, skimming, and vacuuming. Alternately or in addition, separation can potentially include techniques such as centrifugation, pressing and drying; however, those techniques may have limited applicability in processing large volumes of wastewater. The solids 48 can be recovered at a recovery location 50 to be used as fertilizer 52. The treated or output liquid 62 is available for further processing, for reuse, and/or for reentry into natural waterways.

Either separately or in combination with process 10, process 110 can be used. Geo-biological process 110 has some elements in common, but differs from process 10. Similar to process 10, process 110 uses particles of a geologic GEO1 material 122 for example obtained from a mine location 120. An example GEO1 material is dolomite which may, for example be a by-product of a limestone mining operation. The GEO1 material is extracted and sized 124, preferably to a particle size classified as "fine".

Varying from process 10, in process 110 at the preparation location 130, BIO1 ingredients 132 are cultivated and concentrated 133 and also BIO3 ingredients 134 are cultivated and concentrated 135. In certain embodiments, the organisms are in concentrations of about 10,000-100,000 CFU per milliliter of cultures that are in log phase or stationary phase of culture development. The BIO3 ingredients are chosen and function to rapidly transform organic materials that are both dissolved and suspended into new biomass that can easily form colonies. Examples of BIO3 ingredients can include a microbial poly culture including or consisting of: bacteria genera sometimes including but not limited to *Bacillus, Pseudomonas, Actinomycetes, Norcardia, Streptomyces, Acinetobacter, Geobacter, Shewanella, Methylobacterium*, and *Clostridia*; fungal poly culture genera including but not limited to *Rhizopus, Aspergillus, Mucor, Fusarium, Trichoderma*; protozoan such as but not limited to amoeba, paramecium, stentor, *Euglena*; and
genera—*Bacillus*.

Optionally, BIO4 ingredients 136 can be included in process 110. The BIO4 ingredients 136 function as both a carrier media or mass and a carbon source for growing organisms in a waste stream that is rich in nitrogenous compounds. On this media, numerous bacterial and fungal communities can form. Upon growth of these communities, protein for the organisms is created through bioassimilation of the nitrogenous compounds such as ammonia, nitrite, and nitrate. Examples of BIO4 ingredients include: cellulose from woody or non-woody plant species that has high surface area to volume ratio and is available as fiber particles. Preferably, the cellulosic biomass is less than 0.125 inches in diameter for 50% of the material.

The BIO1, BIO3 and any BIO4 ingredients are mixed with the GEO1 material 122 to colonize particles of the GEO1 material 122. In selected embodiments, the ingredients are added based on the particular contaminant concentration and nutrient recovery/contaminant removal goal of the wastewater plant operator. For instances, an effluent with high free nitrogenous compounds may utilize higher levels of BIO4. In certain embodiments, the preparation location 130 may be the same location as the wastewater treatment location 140. In alternate embodiments, the mixture is packaged, for instance in a sealed container. The container can then be transported from the preparation location 130 to the wastewater treatment location 140. In some embodiments, the mixture is sold as a prepared product.

The mixed BIO ingredients and GEO1 materials are dosed 144 and mixed as loose particles into the wastewater liquid 142. Wastewater liquid 142 may have been previously processed or treated. The BIO ingredients are applied in defined dosages based on in-situ factors characteristic of each site's unique chemistry. Dosages may vary substantially from site to site but are generally less than 10% by volume each of BIO1, BIO3 and/or BIO4 to wastewater. The GEO1 material is generally dosed at a ratio of less than 10% by volume to the wastewater. The mixture is held in detention, for example between 1 day and 45 days.

The mixture is then agitated 145 and cultivated 146, causing a portion of the TSS and nutrient load to flocculate. The mixture can then be separated 147 into solids 148 and remaining liquid 162. The solids 148 can be removed to a recovery location 150 to be recovered and used as fertilizer 152. The remaining or output liquid 162 is available for further processing, for reuse and/or for reentry into natural waterways.

Either separately or in combination with processes 10 and/or 110, an algae and microbe based process 210 can be used. In process 210, a BIO2 ingredient mixture 232 is cultured and concentrated 233 in a preparation location 230. The BIO2 mixture may be a green algae mixture designed to promote mixatrophic algae growth to capture nitrogen and phosphorus, to produce oxygen and to convert solids and volatile organics into algal biomass. As representative examples, the BIO2 algae mixture may include *Chlorella vulgaris, Nannochloropsis* spp., *Scenedesmus* spp. and *Euglena* spp. In certain embodiments, the preparation location 230 may be the same location as the wastewater treatment location 240. In alternate embodiments, the mixture is packaged, for instance in a sealed container. The container can then be transported from the preparation location 230 to the wastewater treatment location 240. In some embodiments, the mixture is sold as a prepared product.

The BIO2 mixture 232 is dosed 244 into a wastewater liquid 242 at a treatment location 240. In certain embodiments, the BIO2 mixture has a density of about 100 cells per milliliter or greater. The BIO2 ingredients are applied in defined dosages based on in-situ factors characteristic of each site's unique chemistry. Dosages may vary substantially from site to site but are generally less than 10% by volume BIO2 to wastewater. The concentration is dependent on the detention capacity, hence hydraulic retention time, and desired growth rate desired at the facility. In cooler temperatures when slower growth rates are observed, the initial seed culture inoculant volume can be increased to ensure desired growth rates are achieved. The ambient illumination may also affect growth rates.

When the BIO2 mixture 232 is dosed 244, the mixture is held in detention, for example at least one day and for instance between 1 day and 45 days. During the detention period, the BIO2 and wastewater mixture flocculates 246, growing and converting a portion of the nutrient load and total suspended solids to biomass material.

The mixture can then be separated 247 into solids 248 and remaining liquid 262. The solids 248 can be removed to a recovery location 250 to be recovered and used as fertilizer 252. The remaining treated or output liquid 262 is available for further processing, for reuse and/or for reentry into natural waterways.

Processes 10, 110 and 210 can each be used individually or each can be combined with one or more of the other processes or variations on the processes in various chronological orders depending on the circumstances and needs of a particular arrangement. The decision regarding which process or combination of processes and the order of use may consider: (1) what resources are available to and/or scarce for the wastewater treatment location (e.g., for example if there is an abundance of land-area, then process 210 is favored; alternately if a rapidly implemented treatment is needed, then process 10 is favored, etc.), (2) the extent/efficiency to which the wastewater treatment location wants to remove TSS from the water (e.g., does a regulatory agency require a certain removal level, is there a convenient commercial market for selling fertilizer outputs, etc.), and (3) what is the water chemistry and waste chemistry for the wastewater treatment location. As representative examples, when process 10 is used alone, the TSS capture rate can range from about 30-80%. Similarly, when process 110 is used alone, the TSS capture rate can range from about 30-80%. When process 210 is used alone, the TSS capture rate can range from about 30-99%. When process 10 is followed by process 110 the TSS capture rate can range from about 80-99%. When process 10 is followed by process 210 the TSS capture rate can range from about 80-99%.

Case Study 1

In an example case study, process 10 at 1000 mg/L was applied to an input wastewater liquid 42 containing a total solid suspension TSS concentration of 2,960 mg/L. By using process 10 as a stand-alone process, approximately 31% of the TSS was removed, leaving an output liquid 62 with a TSS concentration of 2,040 mg/L.

Case Study 2

In an example case study, process 110 was applied to an input wastewater liquid 142 containing a TSS concentration of 3,400 mg/L for a five day detention period. By using process 110 as a stand-alone process, approximately 45% of the TSS was removed, leaving an output liquid 162 with a TSS concentration of 1,880 mg/L.

Case Study 3

In an example case study, process 10 at 1000 mg/L was applied followed by process 110 to an input wastewater liquid containing a TSS concentration of 3,400 mg/L. By using process 10 followed by process 110, approximately 98.6% of the TSS was removed, leaving an output liquid with a TSS concentration of 40 mg/L.

Case Study 4

In an example case study, process 210 with >400 FC (foot candles of light) for a 12-hour photoperiod was applied to an input wastewater liquid 242 containing a TSS concentration of 2,960 mg/L for a five day detention period. By using process 210 as a stand-alone process, approximately 47% of the TSS was removed, leaving an output liquid 262 with a TSS concentration of 1,400 mg/L.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed:

1. A method of treating wastewater, comprising:
   a. dosing a wastewater liquid containing suspended solids with a mixture containing loose particles of a geologic material colonized with aerobic bacteria suitable for oxidizing ammonia into nitrite and nitrite into nitrate;
   b. holding the mixture in detention for a time period sufficient to allow the suspended solids to flocculate with the loose particles to float or precipitate; and,
   c. separating the mixture to remove an output liquid from the flocculated particles.

2. The method of claim 1, wherein the geologic material is dolomite.

3. The method of claim 2, wherein the geologic material particle size is classified as fine.

4. The method of claim 1, wherein the geologic material is selected from a group consisting of limestone, calcite, or crushed coral.

5. The method of claim 1, wherein the geologic material is insoluble basic salts selected from a group consisting of calcium oxide, magnesium oxide, or limestone.

6. The method of claim 1, wherein the aerobic bacteria is selected from a group consisting of *Nitrosomonas* spp., *Nitrobacter* spp. and *Nitrospira* spp.

7. The method of claim 1, wherein the mixture is dosed into the wastewater liquid at a dosage of less than 10% by volume to the wastewater.

8. The method of claim 1, wherein the mixture is dosed into the wastewater liquid at a dosage of less than 5% by volume to the wastewater.

9. The method of claim 1, wherein the geologic material is colonized with the aerobic bacteria and a microbial poly culture consisting of bacteria genera.

10. The method of claim 9, wherein the microbial poly culture is selected from a group consisting of *Bacillus, Pseudomonas, Actinomycetes, Norcardia, Streptomyces, Acinetobacter, Geobacter, Shewanella, Methylobacterium, Clostridia*, fungal poly culture genera, protozoan, and genera—*bacillus*.

11. The method of claim 10, wherein the geologic material is colonized with the aerobic bacteria, the microbial poly culture and a cellulosic biomass containing carbon.

12. The method of claim 11, wherein the cellulosic biomass containing carbon is comprised of cellulose from woody or non-woody plant species.

13. The method of claim 11, wherein the cellulosic biomass is comprised of fiber particles which are less than 0.125 inches in diameter for at least 50% of the material.

14. The method of claim 1, comprising:
   a. dosing the output liquid with a green algae mixture selected to promote mixatrophic algae growth;
   b. holding the mixture in detention for a further time period sufficient to allow suspended solids in the output liquid to flocculate with the green algae mixture to convert a portion of the suspended solids to biomass material, and,
   c. separating the mixture to remove the biomass material.

15. The method of claim 14, wherein the green algae mixture is selected from a group consisting of *Chlorella vulgaris, Nannochloropsis* spp., *Scenedesmus* spp. and *Euglena* spp.

16. A method of treating wastewater, comprising:
   a. dosing a wastewater liquid containing suspended solids with a mixture containing particles of dolomite colonized with an aerobic bacteria selected from a group consisting of *Nitrosomonas* spp., *Nitrobacter* spp. and *Nitrospira* spp.;
   b. holding the mixture in detention for a time period sufficient to allow the suspended solids to flocculate with the loose particles to float or precipitate; and,
   c. separating the mixture to remove an output liquid from the flocculated particles.

17. The method of claim 16, wherein the dolomite is colonized with the aerobic bacteria and a microbial poly culture selected from a group consisting of *Bacillus, Pseudomonas, Actinomycetes, Norcardia, Streptomyces, Acinetobacter, Geobacter, Shewanella, Methylobacterium, Clostridia*, fungal poly culture genera, protozoan, and genera—*Bacillus*.

18. The method of claim 17, wherein the dolomite is colonized with the aerobic bacteria, the microbial poly culture and a cellulosic biomass containing carbon.

19. The method of claim 16, comprising:
   a. dosing the output liquid with a green algae mixture selected to promote mixatrophic algae growth;
   b. holding the mixture in detention for a further time period sufficient to allow suspended solids in the output liquid to flocculate with the green algae mixture to convert a portion of the suspended solids to biomass material, and,
   c. separating the mixture to remove the biomass material.

* * * * *